United States Patent
Bauer-Wesely et al.

(10) Patent No.: US 12,487,574 B2
(45) Date of Patent: Dec. 2, 2025

(54) METHOD FOR CHANGING SOFTWARE DATA OF A FIELD DEVICE AND A SYSTEM COMPRISING SUCH A FIELD DEVICE

(71) Applicant: TURCK Holding GmbH, Halver (DE)

(72) Inventors: Michael Bauer-Wesely, Grünhain Beierfeld (DE); Christian Seliger, Lauter-Bernsbach (DE)

(73) Assignee: TURCK Holding GmbH, Halver (DE)

( * ) Notice: Subject to any disclaimer, the term of this patent is extended or adjusted under 35 U.S.C. 154(b) by 449 days.

(21) Appl. No.: 18/153,647

(22) Filed: Jan. 12, 2023

(65) Prior Publication Data
US 2023/0229130 A1  Jul. 20, 2023

(30) Foreign Application Priority Data

Jan. 13, 2022 (DE) .......................... 102022100708.1

(51) Int. Cl.
*G05B 19/042* (2006.01)
*G06K 19/067* (2006.01)
*H04B 10/116* (2013.01)

(52) U.S. Cl.
CPC ....... *G05B 19/0426* (2013.01); *G06K 19/067* (2013.01); *H04B 10/116* (2013.01); *G05B 2219/25428* (2013.01)

(58) Field of Classification Search
None
See application file for complete search history.

(56) References Cited

U.S. PATENT DOCUMENTS 11,029,667 B2    6/2021  Wildsfeuer
2015/0046125 A1* 2/2015  Jagiella ............... G01M 99/008
                                                  702/184

(Continued)

FOREIGN PATENT DOCUMENTS

DE    102016223411 A1   5/2018
DE    10 2016 124146 A1  6/2018

(Continued)

OTHER PUBLICATIONS

European Search Report in Appl. No. 22212884 mailed Mar. 28, 2023, 2 pages.

(Continued)

*Primary Examiner* — Farley Abad
*Assistant Examiner* — Dayton Lewis-Taylor
(74) *Attorney, Agent, or Firm* — Kowert, Hood, Munyon, Rankin & Goetzel, P.C.; Gentry C. McLean; Dean M. Munyon

(57) ABSTRACT

A method for changing software data of a field device is disclosed. In an embodiment, the field device has, in or on a housing, a device code that can be optically detected using a mobile device. An embodiment of the method includes detecting a first device code with a reader unit of the mobile device, accessing primary device data of the field device by the mobile device, and converting the primary device data to secondary device data. The embodiment further includes detecting a second device code and subsequently transmitting the secondary device data to the field device. The second device code may be the same as or different from the first device code. The disclosed embodiments furthermore comprise an associated system.

20 Claims, 2 Drawing Sheets

(56) References Cited

U.S. PATENT DOCUMENTS

2018/0039259 A1    2/2018  Hoferer et al.
2021/0333780 A1*  10/2021  Shah .................. G05B 19/4155
2022/0365506 A1*  11/2022  Mayer ..................... G06F 21/10

FOREIGN PATENT DOCUMENTS

| DE | 10 2017 130138 A | 6/2019 |
| DE | 10 2018 126 231 A1 | 4/2020 |
| DE | 10 2019 116209 A | 12/2020 |
| EP | 3271785 A1 | 1/2018 |
| EP | 3490285 A1 | 5/2019 |

OTHER PUBLICATIONS

Search Report in German Appl. No. 10 2022 100 708.1 mailed May 22, 2024, 7 pages.

* cited by examiner

METHOD FOR CHANGING SOFTWARE DATA OF A FIELD DEVICE AND A SYSTEM COMPRISING SUCH A FIELD DEVICE

CROSS-REFERENCE TO RELATED APPLICATIONS

The present application claims priority under 35 U.S.C. § 119 to German Patent Application No. DE 10 2022 100 708.1, filed Jan. 13, 2022, the disclosure of which is incorporated by reference herein in its entirety.

TECHNICAL FIELD

The present disclosure relates to networked equipment, and particularly to changing the data of a field device.

DESCRIPTION OF RELATED ART

Methods are known in the state of the art in which electrical devices can be controlled via a mobile end device such as a smartphone or a tablet computer.

From EP 3 271 785, for example, an external control module as smartphone or tablet computer is known that is used for exchanging data with a human-machine interface (HMI) of a machine, wherein the HMI is used for the user input of control commands to the machine and wherein the external control module is configured such that it can be wirelessly connected to the HMI in order to exchange at least one HMI data set with the HMI. Here, the external control module is a mobile telephone or a tablet computer, which is configured such that a special application is installed on the external control module that can communicate with the HMI or the machine via a wireless communication connection or a mobile radio connection, the special application on the external control module is set up to create at least one HMI data set and transmit it to the HMI or the machine.

DE 10 2016 223 411 A1, for example, shows a further method, which comprises, for operating a production system, steps that can be performed automatically and steps to be performed manually at various elements of the system. Here, machine-readable items of information, which identify the respective element, are attached to at least one of the various field elements, wherein, in an arithmetic unit, an execution status, which is set under the condition to "executed", is assigned in each case to the steps to be performed manually, and that the machine-readable items of information at least at one predefined element are read out by means of a mobile end device, and wherein a control device undertakes the steps that can be performed automatically taking into consideration the execution status. Here, the machine-readable items of information can represent optically readable items of information, such as for example a barcode or a QR code.

These methods have the disadvantage that mistakes and incorrect inputs are possible if the operator finds themself in front of a large number of similar field devices or moves away to process the data and the assignment to the respective field device is possibly lost.

SUMMARY OF DISCLOSED EMBODIMENTS

The object of the disclosed embodiments is to provide an improved method for changing the data of a field device. This object is achieved according to the disclosed embodiments by method and system embodiments as described herein. Advantageous embodiments are specified in the respective, associated claims.

Accordingly, the object is achieved by a method for changing software data of a field device, wherein the field device has a one-sided or multi-sided housing and a device code that can be detected by an operator with a mobile end device is applied to or in the housing. This device code is formed as a presence device code, which means that the physical presence of the mobile end device at close range is necessary to detect it. Furthermore, to or in the housing also means inside or outside the field of view or the direct access of an operator, such as for example behind a wall or cover, depending on the technical mode of operation of the device code and its interaction with the mobile end device.

Through a first identification step, the detection of the device code is effected with a reader unit of a mobile end device, as a result of which primary device data are received from the field device and/or taken from a (central) data store, wherein in particular the field device is activated directly or through a superordinate device unit, wherein in at least one subsequent adaptation step, the primary device data are converted to secondary device data.

This conversion of the primary data into secondary data is not to be understood by way of limitation and can consist of manually or semi-manually effecting a complete set of data to be exchanged and/or overwritten. Furthermore, this conversion can also consist of the manual changing of individual values or status information. Here, the conversion of the data can be effected directly on or by the mobile end device. Alternatively or supplementally, the mobile end device can be used as a remote desktop and the selection and/or the processing of the primary device data and/or the secondary device data can be effected on a connected central computer or server.

Finally, in a complementation step, the change is completed, which is defined by the successful, permanent utilization of the secondary device data in the field device. Here, before the change is completed, an obligatory second identification step is effected via a further detection of a device code, and wherein in particular following the second identification step, secondary device data are transmitted to the field device by the mobile end device. This means that data is prevented from being written onto the field device in particular before the second identification step is carried out.

This local second identification of the mobile end device at the respective field device before the transmission of secondary device data substantially increases the security of the correct data transmission and furthermore cabled, local HMIs can be saved without compromising on data security.

Here, field device means in particular electronic control cabinet modules, such as IO-Link devices or IO-Link masters, but also simple field sensors or field actuators of a larger system.

The exchange of data between the mobile end device and the field device is generally effected indirectly via a central control and regulating unit with which a wireless exchange of data is possible and which is directly or indirectly connected to the respective field device so as to carry data. In an advantageous method, the operator changes the primary device data in the mobile end device (tablet computer, smartphone (app)) and/or directly in a server or cloud application of the system operating company and/or of the manufacturer, or retrieves the appropriate secondary device data for the later transmission and optionally adapts them in an appropriate manner. This means in particular that, in one embodiment of the method, in this step the operator can edit or prepare data outside the field device and then subsequently transmit them to the field device.

The actual data transfer to the field device is effected either directly between smartphone and field device, in particular wirelessly, or wirelessly via this very server or the cloud or a superordinate module that is capable of wireless communication, which are connected to the field device so as to carry data. These address the field device directly or indirectly via corresponding communication networks (Ethernet, fieldbus, IO-Link, SPE or the like) for the purpose of acquiring the secondary device data.

Thus, by a "central control and regulating units" are to be provided such a server or cloud application and/or such a superordinate module.

In a method variant, the further detection of a device code is effected via the same device code as in the first identification step, wherein alternatively or additionally the second identification step can also be effected via a further device code, which is different from the first device code.

On the whole, "device code" is not to be understood by way of limitation and means any type of a presence device code which is formed as at least one of the following types of code, such as for example an optically detectable, passive code, in particular a 2D code, such as for example a barcode, a QR-Code®,
—an optically detectable, active code, in particular a switchable luminescence or a light pattern, luminous colour(s), such as can be produced for example by one or more lightbulbs, LEDs, OLEDs, etc., an acoustic code, such as for example a single tone, a sequence of tones at one or different pitches and/or tone lengths, etc. or an inductive Near Field Code (NFC), in particular a passive transmitter (passive NFC tag).

The acoustic code can be produced via an integrated speaker or via vibrations of components of the field device, such as for example the humming of suitably excited coils, an engine or the like. Whether it is advantageous to provide the acoustic code in the audible or infrasonic range depends very heavily on the respective spatial circumstances. If it is necessary to guide the operator in very complex system superstructures, a signal or device code that is audible to the user is generally advantageous.

A further improvement of the method consists of undertaking the first identification step before carrying out the second identification step for two or more field devices one after the other. The subsequent second identification step and the transmission of secondary device data by the mobile end device to a single field device is subsequently undertaken in each case completely one after the other to a single field device. In other words, device data for structurally identical field devices such as electronic control cabinet components can be undertaken together and as a group, but the completion of the data acquisitions including the second identification step must be undertaken individually. Thus, it is always ensured that data are transmitted completely and correctly.

In a further improved method, immediately before or after the acquisition of the secondary device data by the field device and before the complementation, at least one verification step is effected, in which a physical signal detectable by the mobile end device and/or the user, in particular a light and/or an audio signal, is sent by the field device. With this physical signal, the correct acquisition of the secondary device data is indicated and acknowledged by the field device. The physical signal can also be utilized for the identification of the field device before the secondary data are transmitted and utilized as a readiness indicator for the reception of data by the field device.

Here, "directly" means that this verification step, and thus the transmission of the physical signal, is effected within a few seconds, ideally in less than two seconds, when a successful or intended transfer of secondary device data has been recognized by the field device.

This physical signal can consist of a light signal, which
is emitted by a single light, as stated above and subsequently always called LED for this, or a group of lights (LEDs) in or on the housing of the field device and/or at a flash frequency, in a colour (wavelength), in a number of shining LEDs and/or a combination hereof.
is emitted by the TX/RX-LED on the Ethernet connector, such as an RJ45 connector on the field device. Ideally, items of information which can be read by the mobile end device are sent to it via such an optical channel.

The physical signal can also consist of an audio signal, which is emitted by the field device over a frequency detectable by the mobile end device. Here, for example an excited coil, an engine noise (humming), the clocked opening and closing of actuators at a target frequency can be used as source. Additionally or supplementally, a frequency can be emitted via a speaker of the field device. Ideally, the frequencies are in the infrasonic range and are detected by the mobile end device via a corresponding detection device.

The specific signal is triggered by a superordinate device unit, thus control command, or is stored at least temporarily in the field device as a control command.

The verification can consist of the value transmitted in this way, such as number of LED lights, flash frequency, etc., having to be input into the associated application in the mobile end device and optionally sent to the superordinate device unit before the complementation can be effected. Analogously to a TAN generator, a numeric code, which must be utilized in a defined way, can also appear on the mobile end device.

To increase the security, a second verification step can is effected the above-mentioned first verification step, with the same physical signal and
the same code and/or code sequence or
a different code or code sequence. Alternatively, a physically different signal and
a new code and/or a new code sequence or
the same code and/or the same code sequence can be provided.

Thus, a further-improved method consists of a test data set, for example in the form of a test sum, a code or a hash value, being sent, before the first and/or the second verification step, by the field device to a superordinate device unit and compared by the superordinate device unit with target test data and, in the case of agreement, a confirmation data set being sent back to the field device, and wherein the first, second verification step and/or completion step is triggered by the field device only after the receipt of the confirmation data set by the field device. An expected change value can thus be checked and finally approved by the superordinate device unit.

In a further-improved method, the second or a further verification step can also consist of the operator having to input a personal password into the mobile end device and the respective application, in particular depending on the relevance of an intended change in the primary data indicated in the first or second identification step, before the complementation is effected. In other words, it is advantageous if, before the first and/or the second verification step, an operator ID must be sent by the operator to a superordinate device unit and is compared by the superordinate device unit with a target operator ID and wherein, after agreement of the superordinate device unit, an approval to carry out the respective verification step is sent. This operator ID can relate to a personal qualification, a processing history, another authorization or another system parameter.

In the case of large systems or assemblies with a large number of uniform component parts, the identification in the field can be difficult. An improved method thus consists of a physical information signal detectable by an operator and/or the mobile end device being sent by the field device, before an identification step, wherein this information signal in particular is used by the operator for locating the field device. This physical signal can in particular consist of one or more of the light or audio signals described above.

The method can be further improved to the effect that a BLE scan (Bluetooth Low Energy Scan) is undertaken instead of the optical scan, or in addition hereto.

The disclosed embodiments furthermore comprise a system which has at least one field devices and at least one superordinate device unit which is connected to the at least one field device. This furthermore has at least one control unit and at least one data store, wherein the system is formed to carry out the method according to one of the above-mentioned embodiments.

The superordinate device unit can be connected to the control unit and/or the data store so as to carry data, or they are, individually or together, an integral part of the superordinate device unit. The superordinate device unit can be, for example, an IO-Link master or a comparable electronic component part, which is connected to a plurality of field devices and controls them.

DETAILED DESCRIPTION

Figure 1:
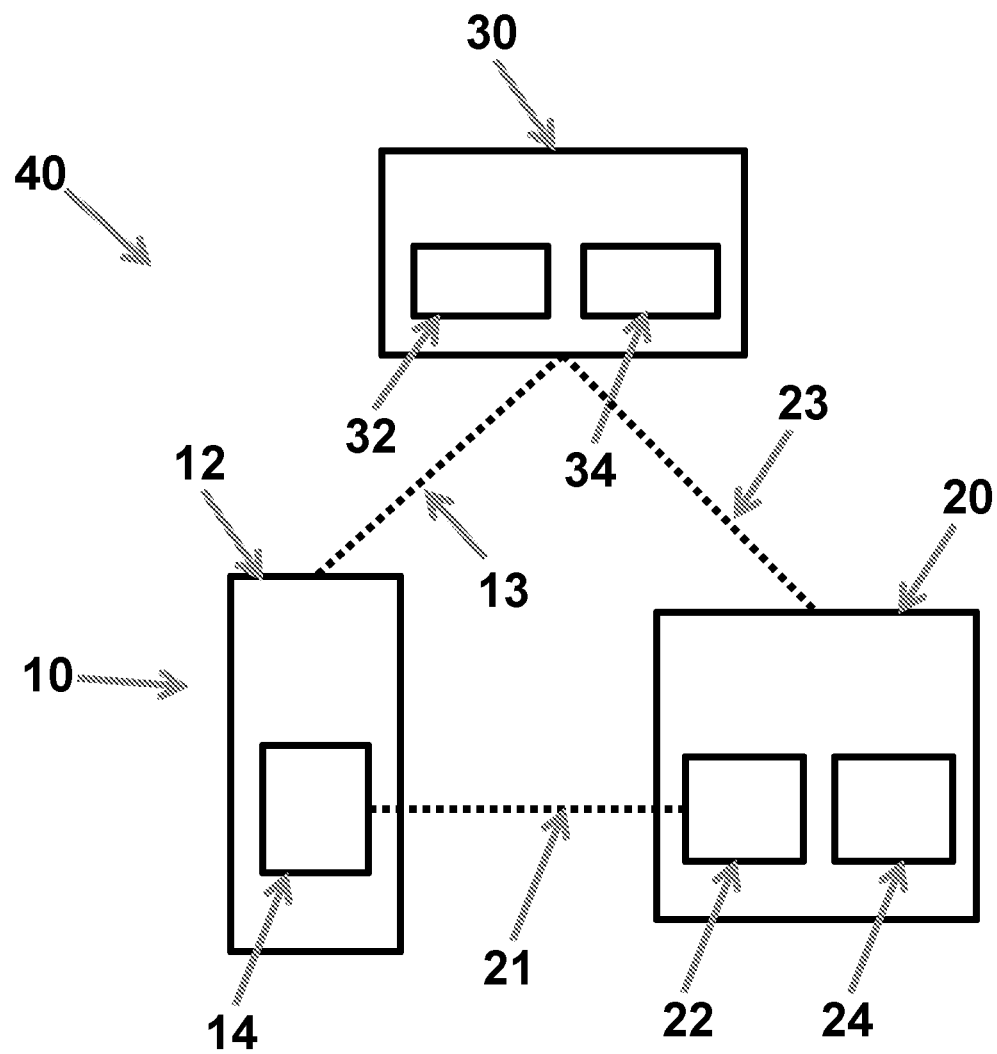
FIG. 1 is a block diagram illustrating an embodiment of a system as described herein.

An exemplary system 40, which is formed to carry out the method according to one of the above-mentioned embodiments, is shown in FIG. 1. Herein, a field device 10 is shown with a one-sided or multi-sided housing 12 and a device code 14 that can be detected by an operator with a mobile end device 20. In this exemplary system 40, the mobile end device 20 has a reader unit 22 and a display 24. A superordinate device unit 30 has a control unit 32 and a data store 34, and it is connected to the field device 10; in an embodiment, the superordinate device unit 30 acts as a central control and regulating unit. The system is configured such that the device code 14 can be scanned or detected by the reader unit 22 of the mobile end device 20; this communication capability is indicated by a dotted line 21 between the device code 14 and the reader unit 22. In this exemplary system 40, there is a first data connection 13 between the field device 10 and the superordinate device unit 30, and a second data connection 23 between the mobile end device 20 and the superordinate device unit 30.

Figures 2, 3:
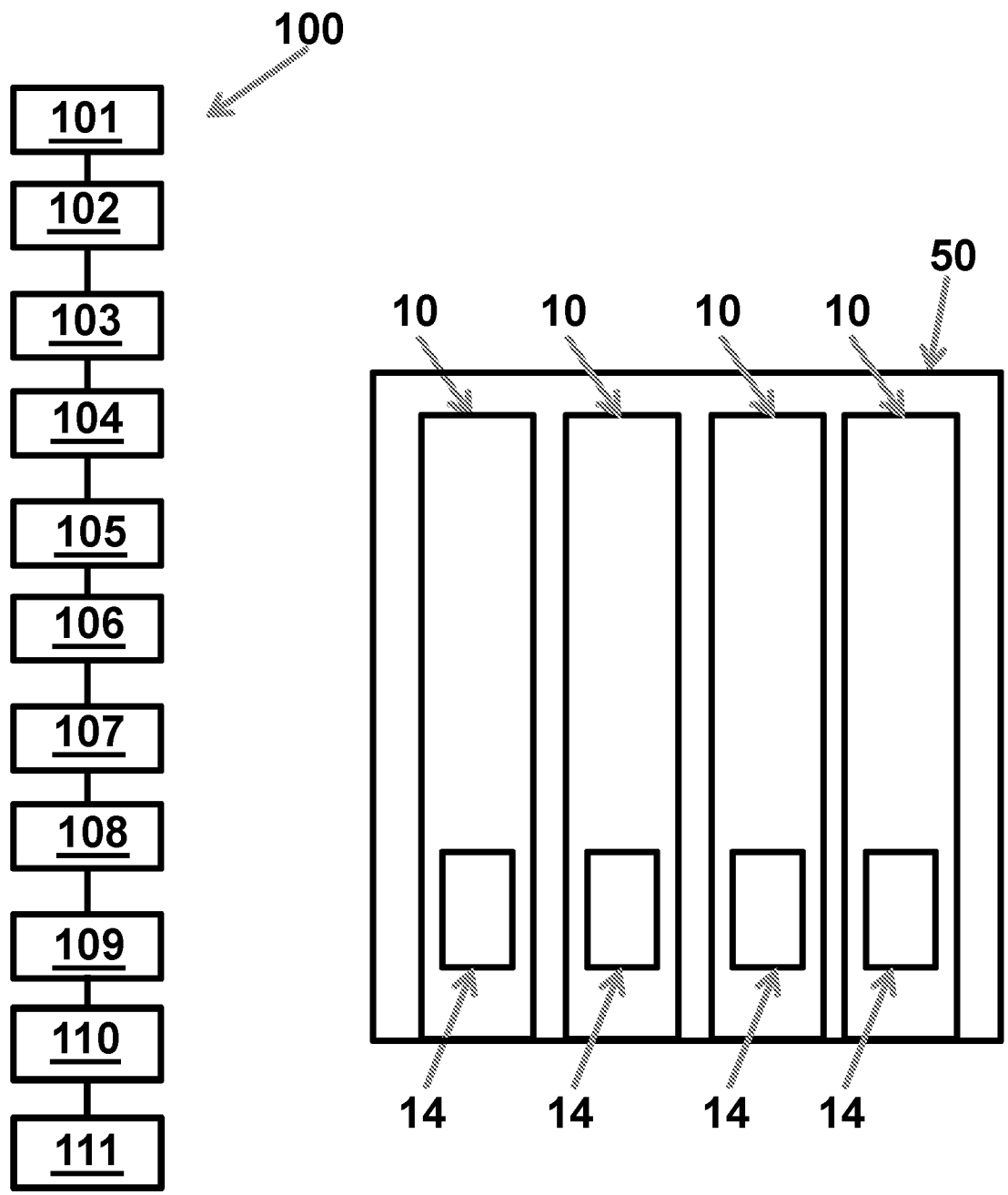
FIG. 2 is a flow diagram illustrating an embodiment of a method as described herein.
FIG. 3 is a block diagram illustrating an embodiment of a group of field devices as described herein.

In an exemplary method 100, as shown in FIG. 2, the following steps are performed. In an embodiment, method 100 is performed using the exemplary system 40 as described above.

Step 101: Scan of the first device code 14 as QR code of the field device 10 to be coupled as first identification step (read function).

Step 102: The field device 10 scanned in this way is indicated on the display 24 of the mobile end device 20 (show function).

Step 103: Selection of the field device 10 in the display 24 or by means of a display input in the case of the detection of a plurality of field devices.

Step 104: Display of the relevant device information, such as process values, diagnostic data, datasheets, parameters, etc. (select function).

Step 105: Carrying out a first verification step on the basis of the personal authorizations (right function), by comparing an operator ID recorded in the mobile end device 20 with a centrally recorded target ID:
a) Level 1: basic function as a pure view function
b) Level 2: analogous to Level 1 with authorization of process-relevant parameter changes
c) Level 3: analogous to Level 2 with authorization to trigger e.g. updates and/or superordinate structural changes.

Step 106: Conversion of the primary device data into secondary device data by the operator, depending on Levels 1 to 3.

Step 107: Second scan of the first (one) device code 14 or a second device code as second identification step.

Step 108: Acquisition of the secondary device data by the field device 10 (write function).

Step 109: Transmission of a hash value by the field device 10 to a superordinate device unit 30.

Step 110: Confirmation of the hash value by the superordinate device unit 30 to the field device 10.

Step 111: Carrying out the completion step in/by the field device 10.

The important thing in the method here is that a unique, second identification has to be effected between the same mobile end device and the field device in particular before the recording (writing) and/or activating of secondary device data on the field device. Thus, it is in particular advantageous if a device ID, such as a MAC address, is at least temporarily stored in the field device or a superordinate device unit in the first identification step.

In the above-mentioned method 100, the field devices 10, as shown in FIG. 3, are IO-Link modules in a switch and control cabinet 50, wherein the device codes 14 are applied to or printed on the narrow front surface as 7.5×7.5 mm large QR codes, which are digitally readable with a usual QR code scanner of a smartphone or tablet computer.

What is claimed is:

1. A method for changing software data of a field device, wherein the field device has a housing and wherein applied to or in the housing is a first device code that can be detected using a mobile device at close range, the method comprising:

detecting, in a first identification step, the first device code by a reader unit of the mobile device;

accessing, by the mobile device, primary device data of the field device;

converting the primary device data to secondary device data;

detecting, by the mobile device in a second identification step, a second device code associated with the field device;

subsequent to detecting the second device code, transmitting the secondary device data to the field device;

utilizing, by the field device in a completion step, the secondary device data;

immediately before or after transmitting the secondary device data to the field device, receiving by the mobile device in a first verification step a first physical signal sent by the field device;

receiving, by the mobile device in a second verification step after the first verification step, a second physical signal sent by the field device;

sending, by the field device and before the first or the second verification step, a test data set to a superordinate device unit;

comparing, by the superordinate device unit, the test data set with target test data; and based on an agreement between the test data set and the target test data, sending, by the superordinate device unit, a confirmation data set to the field device, and wherein the first or second verification step or the completion step is triggered by the field device only after a receipt of the confirmation data set by the field device.

2. The method according to claim 1, wherein the first device code is formed as at least one of: an optically detectable passive code, an optically detectable active code, an acoustically detectable code or an inductive Near Field Code (NFC).

3. The method according to claim 1, wherein the second device code is the same as the first device code.

4. The method according to claim 1, wherein detecting the second device code of a given field device and transmitting the secondary device data by the mobile device to the given field device are performed prior to detecting a second device code of another field device.

5. The method according to claim 1, wherein the first physical signal comprises a light signal sent using a light-emitting diode (LED) or an audio signal.

6. The method according to claim 1, further comprising, before detecting the first device code, sending, by the field device, a physical information signal detectable by the mobile device or an operator of the mobile device.

7. A method for changing software data of a field device, wherein the field device has a housing and wherein applied to or in the housing is a first device code that can be detected using a mobile device at close range, the method comprising:
    detecting, in a first identification step, the first device code by a reader unit of the mobile device;
    accessing, by the mobile device, primary device data of the field device;
    converting the primary device data to secondary device data;
    detecting, by the mobile device in a second identification step, a second device code associated with the field device;
    subsequent to detecting the second device code, transmitting the secondary device data to the field device;
    utilizing, by the field device in a completion step, the secondary device data;
    immediately before or after transmitting the secondary device data to the field device, receiving by the mobile device in a first verification step a first physical signal sent by the field device;
    receiving, by the mobile device in a second verification step after the first verification step, a second physical signal sent by the field device; and
    before the first or the second verification step:
        receiving, by a superordinate device unit, an operator ID from an operator of the mobile device;
        comparing, by the superordinate device unit, the operator ID with a target operator ID; and
        based on an agreement of operator ID with the target operator ID, sending, by the superordinate device unit, an approval to carry out the first or second verification step, the second identification step or the completion step.

8. The method of claim 7, further comprising, before detecting the first device code, sending, by the field device, a physical information signal detectable by the mobile device or an operator of the mobile device.

9. The method of claim 7, wherein the first device code is formed as at least one of: an optically detectable passive code, an optically detectable active code, an acoustically detectable code or an inductive Near Field Code (NFC).

10. A system, comprising:
    at least one field device, wherein:
        applied to or in a housing of the field device is a first device code detectable using a mobile device in a first identification step and a second device code detectable using the mobile device in a second identification step;
        the field device is associated with primary device data accessible by the mobile device after the first identification step;
        the field device is configured to receive secondary device data produced by the mobile device and to utilize the secondary device data after the second identification step; and
    at least one superordinate device unit coupled to and configured for communication with the at least one field device, wherein the superordinate device unit is configured to:
        receive a test data set from the field device;
        compare the test data set with a target test data set; and
        based on an agreement between the test data set and the target test data set, send a confirmation data set to the field device.

11. The system of claim 10, wherein the first device code is the same as the second device code.

12. The system of claim 10, wherein the superordinate device unit is configured to activate the field device and perform communication between the field device and the mobile device.

13. The system of claim 10, further comprising at least one control unit and at least one data store.

14. The system of claim 13, wherein the superordinate device unit includes the at least one control unit and at least one data store.

15. The system of claim 10, wherein the field device is configured to send a first physical signal detectable by the mobile device in a first verification step.

16. The system of claim 15, wherein the field device comprises one or more light-emitting diodes (LEDs) and the first physical signal comprises a light signal.

17. The system of claim 15, wherein the field device comprises a coil, actuator, or other component and the first physical signal comprises an audio signal.

18. The system of claim 15, wherein the field device is configured to send a second physical signal detectable by the mobile device in a second verification step.

19. A system, comprising:
    at least one field device, wherein:
        applied to or in a housing of the field device is a first device code detectable using a mobile device in a first identification step and a second device code detectable using the mobile device in a second identification step;

the field device is associated with primary device data accessible by the mobile device after the first identification step;

the field device is configured to receive secondary device data produced by the mobile device and to utilize the secondary device data after the second identification step; and at least one superordinate device unit coupled to and configured for communication with the at least one field device, wherein the superordinate device unit is configured to:

receive an operator ID from an operator of the mobile device;

compare the operator ID with a target operator ID; and based on an agreement of the operator ID with the target operator ID, send an approval to carry out a verification step, the second identification step or a completion step.

20. The system of claim 19, wherein the first device code is the same as the second device code.

* * * * *